O. PEDERSON.
Caster.
No. 223,948.  Patented Jan. 27, 1880.
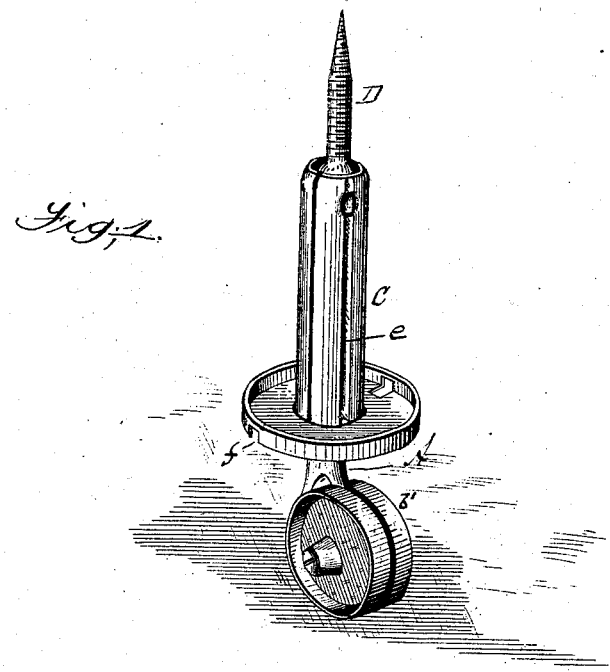
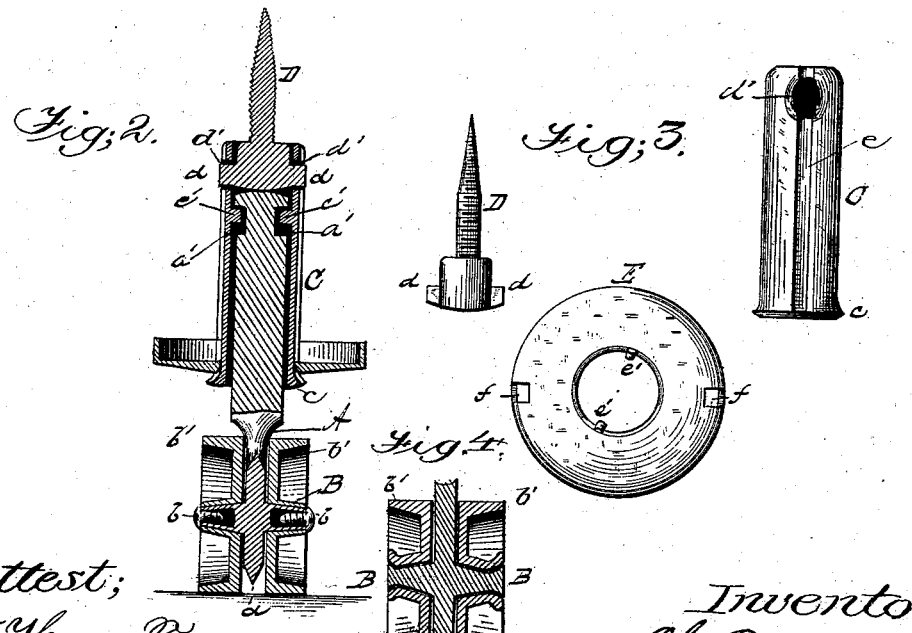
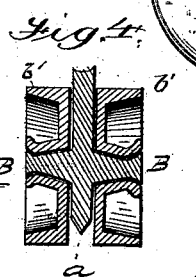
Attest:
P. Walter Fowler,
Jno. L. Condron.
Inventor
Ole Pederson
per attys.
A. H. Evans & Co.

UNITED STATES PATENT OFFICE.

OLE PEDERSON, OF JOLIET, ILLINOIS.

CASTER.

SPECIFICATION forming part of Letters Patent No. 223,948, dated January 27, 1880.

Application filed September 30, 1879.

*To all whom it may concern:*

Be it known that I, OLE PEDERSON, of Joliet, Illinois, have invented a new and useful Improvement in Furniture-Casters, of which the following is a clear, full, and exact description, reference being had to the accompanying drawings, making a part of this specification, in which—

Figure 1 is a perspective view of a caster with my improvements attached. Fig. 2 is a vertical section of same. Figs. 3 and 4 show details to be referred to.

The object of my invention is to produce a furniture-caster which will better stand the strain which they have to bear, and which is at the same time simple in construction; and it consists of the combination of devices hereinafter explained and claimed.

To enable others skilled in the art to make and use my invention, I will proceed to describe the exact manner in which I have carried it out.

In the drawings, A represents the shank of a caster, terminating at its bottom in the flat plate $a$, and near its top provided with the groove $a'$, for purposes hereinafter explained. On each side of the flat plate $a$ is cast a short trunnion or axle, B, internally screw-threaded and countersunk for the purpose of receiving the screws $b$, which hold the wheels $b'$ in position.

Around the shank A is the sleeve C, formed in two halves longitudinally, for a purpose which will hereinafter appear, and provided with a flange, $c$, at the lower edge, and with a slot or opening, $d'$ $d'$, on each side, near its upper edge, to receive the lugs $d$ $d$, formed on the head of the screw D, as shown in Fig. 2. By means of the screw D the caster is readily secured within the hole prepared for its reception in the leg of any article of furniture.

Within the sleeve C are cast the lugs $c'$ on opposite sides, which fit snugly into the groove $a'$ in the upper part of the shank, and secure the shank in its position within the sleeve C, as shown in Fig. 2. On each half of the sleeve I provide the longitudinal grooves $e$ for the reception of the lugs $e'$ $e'$ on the annular plate E, which, fitting around the sleeve, holds the two halves firmly together, as shown in Fig. 1. The plate E not only forms a neat finish and ample protection to the lower end of the leg, but by means of the notches $ff$ it acts as the head of the screw to receive a suitable wrench or screw-driver and operate the screw D.

Instead of screw-threading the short trunnions B for the reception of the screws $b$, I usually make the trunnions with a swell at the end to secure the wheels, as shown in Fig. 4. This swell may be made either during the casting or by subsequent riveting. This construction obviates the use of screws.

Having thus explained my invention, what I claim to be new, and desire to secure by Letters Patent, is—

The shank A and sleeve C, provided with the notches $ff$ and slots $d'$ $d'$, in combination with the screw D, formed with the lugs $d$ $d$, substantially as and for the purpose set forth.

OLE PEDERSON.

Witnesses:
 CHARLES W. STAEHLE,
 G. W. FULLER.